United States Patent
Wang

(10) Patent No.: US 6,697,121 B2
(45) Date of Patent: Feb. 24, 2004

(54) SYNCHRONOUS DECODING METHOD FOR AV PACKETS

(75) Inventor: Chi-Hui Wang, Hsinchu (TW)

(73) Assignee: Winbond Electronics Corp., Hsinchu (TW)

( * ) Notice: Subject to any disclaimer, the term of this patent is extended or adjusted under 35 U.S.C. 154(b) by 438 days.

(21) Appl. No.: 09/909,956

(22) Filed: Jul. 20, 2001

(65) Prior Publication Data

US 2002/0140858 A1 Oct. 3, 2002

(30) Foreign Application Priority Data

Mar. 29, 2001 (TW) ....................................... 90107433 A

(51) Int. Cl.⁷ .......................... H04N 7/626; H04N 9/475
(52) U.S. Cl. .................... 348/515; 348/512; 348/423.1; 348/425.4
(58) Field of Search ................................ 348/515, 512, 348/513, 518, 500, 501, 423.1, 425.4, 738, 485; 375/240.28, 240.26; 386/96, 99, 119; 370/350, 503

(56) References Cited

U.S. PATENT DOCUMENTS

| | | | | |
|---|---|---|---|---|
| 5,771,075 A | * | 6/1998 | Rim et al. ................... | 348/512 |
| 5,812,201 A | * | 9/1998 | Yoo .......................... | 348/423.1 |
| 5,815,634 A | * | 9/1998 | Daum et al. .................. | 386/96 |
| 5,959,684 A | * | 9/1999 | Tan et al. .................... | 348/515 |
| 6,016,166 A | * | 1/2000 | Huang et al. ................ | 348/515 |
| 6,088,063 A | * | 7/2000 | Shiba ......................... | 348/515 |
| 6,313,879 B1 | * | 11/2001 | Kubo et al. ................. | 348/512 |
| 6,452,974 B1 | * | 9/2002 | Menon et al. ......... | 375/240.28 |
| 6,512,884 B1 | * | 1/2003 | Sawada ....................... | 386/96 |
| 6,583,821 B1 | * | 6/2003 | Durand ....................... | 348/515 |

* cited by examiner

Primary Examiner—Michael H. Lee
Assistant Examiner—Jean W. Désir
(74) Attorney, Agent, or Firm—William E. Pelton, Esq.

(57) ABSTRACT

A synchronous decoding method for AV packets that solves the problem of asynchronous AV signals resulting from the decoding restoration of an AV packet-type bitstream. No large PTS memory is needed as an index table for a video buffer with the method. One PTS value is sampled and recorded at one time. The old PTS value is replaced in the next sampling. The rest of the unrecorded PTS data are estimated using the frame rate and the previous PTS value. This method not only simplifies the structure but also provides a smoother playing effect for an AV source with a higher error rate, rendering better noise tolerance.

10 Claims, 3 Drawing Sheets

SYNCHRONOUS DECODING METHOD FOR AV PACKETS

BACKGROUND OF THE INVENTION

1. Field of Invention

The invention relates to a synchronous decoding method for AV packets. More particularly, it relates to a method for performing synchronous decoding on video and audio signals in an AV packet-type bitstream, which has a simpler structure and better noise tolerance ability. The method can provide a smoother playing effect especially when the quality of the AV source is bad because of too much noise and a higher error rate.

2. Related Art

In a digital era, many early analog AV data were converted to digital data due to their various limitations in storage, recycling and copying and do not exist any more. Since digital AV data can be easily recorded and stored in a small space and managed using a computer, they indeed show extremely good applicability. With reference to FIG. 4, digital AV data characters, such as MPEG (Motion Picture Expert Group) data, are presented in bitstreams. The video and audio signals are stored in a bitstream in the form of packets. An AV decoder receives such AV data based on the order the data enter the device. That is, the audio and video data cannot be received simultaneously. Therefore, subsequent processing has to synchronize the audio and video signals to play the data simultaneously.

With reference to FIG. 5, to achieve this effect, each AV data packet includes a PTS (Presentation Time Stamp) in the packet header in addition to the AV data (13). The PTS, that is the playing time of the first picture header occurring in current packet, is used to synchronize the audio and video data. There is also an audio/picture header (12) within the AV data (13) to indicate the start point of every frame of video or audio data or to record relevant data for the AV signals. Therefore, before the AV decoder displays pictures, it first checks the relation between the PTS and an STC (System Time Clock) in the picture data. If the PTS is less than the STC, the previous picture has to be played again to slow the picture decoding speed. Conversely, if the PTS is larger than the STC, several pictures have to be skipped to catch up with the STC speed. The STC is thus used as a reference for synchronizing the AV signals.

There are currently two widely used synchronization methods for AV packet-type bitstreams. One of them is to directly synchronize the video and audio signal with the STC. This method requires both repeat and skip functions for both video and audio signals. This results in complications in processing. The second method is to set the audio data playing time as the STC and to synchronize the video data with the audio clock. This then only requires the repeat and skip functions for the video data. Consequently, the processing is simpler and more efficient.

Although the method of controlling just the video data is more efficient, the existent synchronous decoding architecture still has a complicated structure and low noise tolerance (noise immunity). With reference to FIG. 6, the AV bitstream (10) contains video and audio data extracted using a demultiplexer (20). The two types of data are sent through independent buffers (30, 40) and decoders (50, 60) to send out decoded video and audio data. In addition to requiring large capacities in the two sets of buffers (30, 40) to store more pictures and audio signals for AV synchronization processing, a PTS buffer (70) is needed by the demultiplexer (20) to store various PTS data corresponding to each AV data packet in the video buffer (30) and establish an index for managing the video buffer (30). This index makes it possible to quickly obtain the picture data to be played repeatedly. This design is acceptable for good quality AV sources but may cause serious problems in PTS data linked with AV data for AV sources with bad quality, too much noise and a higher error rate (e.g., a bad CD-ROM or seriously scratched CD-ROM). Wrong PTS records and picture heads may induce accumulation error within PTS buffer. This kind of database disorder is very hard to be detected and recovered. Therefore, the AV synchronization structure of the PTS buffer (70) is not able to provide good noise immunity.

SUMMARY OF THE INVENTION

An objective of the invention is to provide a synchronous decoding method for AV packets, which has better noise immunity to be able to play AV signals smoothly even when there is a lot of AV noise.

Another objective of the invention is to provide a synchronous decoding method for AV packets that simplifies the conventional structures. The method and simplified structure do not need to use a PTS buffer or to store a large amount of PTS data. Only two variables are needed along with one sampled PTS value. So the invention has the advantages of saving memory resources and a simpler structure.

A further objective of the invention is to provide a synchronous decoding method for AV packets, which only records the PTS value of some video packets. The PTS values of other video packets are estimated using the frame rate and the previous PTS value. By estimation, the problem of incorrect video correspondence due to an incorrectly recorded PTS value can be avoided. Thus, the invention can avoid excessive image flickering, thereby rendering a smoother playing effect.

The main feature of the invention uses a technique where only two sets of variables are used to record video Buffer_Size and Current_PTS. By using a method similar to fixed-time sampling, only one PTS value is recorded and is continuously replaced by reading subsequent PTS values. The time interval between two sampling times is determined from the Buffer_Size measured in the previous sampling, specifically, the amount of video data in the video buffer waiting to be decoded. The PTS data of each video packet during the non-sampling time period are ignored. They are estimated using the frame rate and the previous PTS value. This process is performed repeatedly so as to provide a simpler structure but a smoother playing effect particularly for AV sources with a lot of noise.

DETAILED DESCRIPTION OF THE INVENTION

Figure 6:
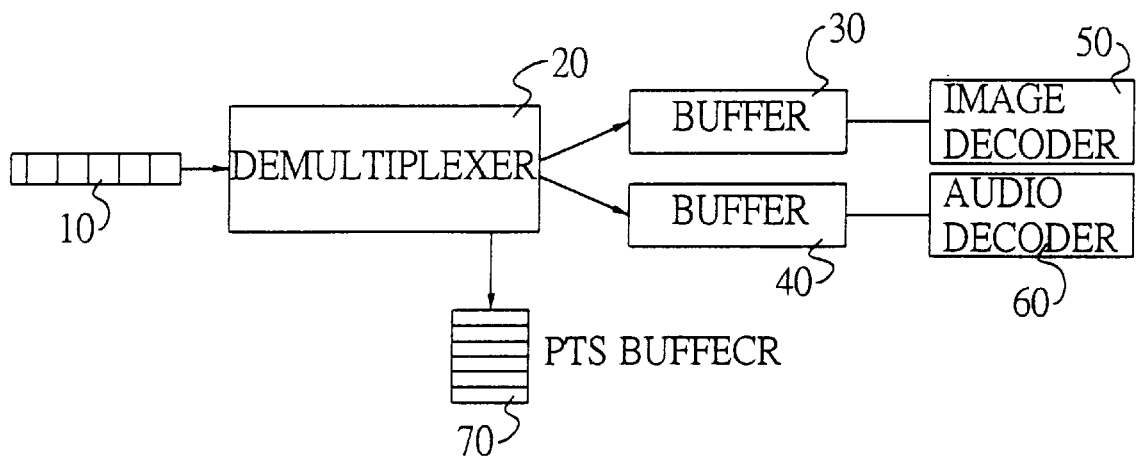
FIG. 6 is a block diagram of a conventional AV decoder.

The method for performing synchronous decoding on video and audio signals in an AV packet-type bitstream in accordance with the present invention omits the PTS (Presentation Time Stamp) buffer (70) in FIG. 6. That is, the invention does not record all PTS data but only keeps one PTS value. The rest of the PTS data are ignored and synthetically constructed using the frame rate and the previous PTS value. The method does not record all the PTS data so that it can avoid various problems derived from recording incorrect PTS data. Through estimation, the calculated PTS data links with the video data smoother, thereby providing a better playing effect without serious flickering.

Figure 3:
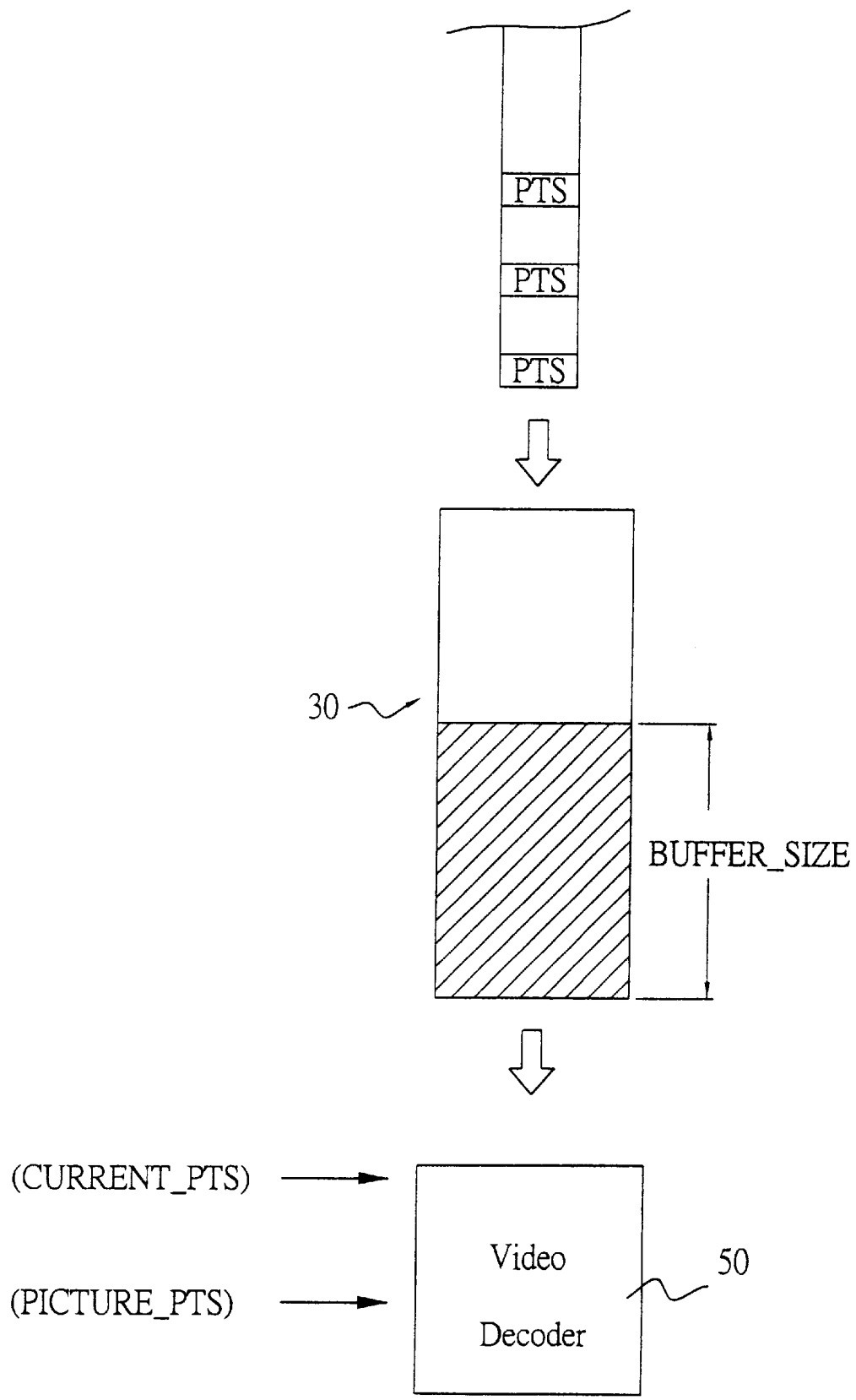
FIG. 3 is a schematic diagram of the method for performing synchronous decoding on video and audio signals in an AV packet-type bitstream in accordance with the present invention.
Figure 4:
FIG. 4 is a schematic diagram of an AV packet-type bitstream.
Figure 5:
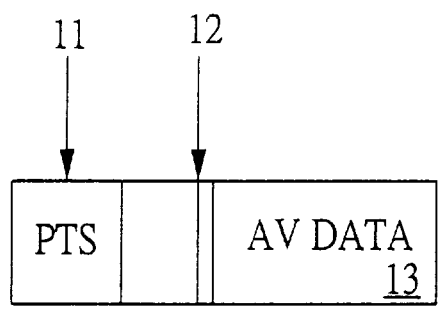
FIG. 5 is a schematic diagram of an AV packet.

The concept of keeping only one PTS value while still keeping AV signals synchronized is schematically shown in FIG. 3. When a video packet is sent to the video buffer (30), the video decoder (50) retrieves the data in the video buffer (30) based on a first-in first-out sequence. The invention uses two parameters: namely the Buffer_Size and the Current_PTS. The Buffer_Size is the amount of data in the video buffer (30) to be decoded when the PTS is sampled. The Current_PTS stores the PTS value of the currently sampled video packet. The picture PTS is the PTS value of the picture that the video decoder (50) starts to decode.

When the video packet proceeds in the previously mentioned method, the Buffer_Size and the Current_PTS parameters are recorded. The recorded Buffer_Size is reduced as the video signals are decoded (there are still data continuously entering the video buffer (30)). When the Buffer_Size decreases to zero, the previously obtained PTS value is then set as the picture PTS value and sent to the video decoder (50), which then starts to decode the picture corresponding to the PTS. The system then triggers to obtain the second Buffer_Size and Current_PTS parameters. This process is repeated until the AV signals are finished. The rest of the PTS values in each video packet are abandoned. The picture PTS data needed for the video decoder (50) are computed using the frame rate (e.g., 30 frames/sec for an NTSC system and 25 frames/sec for a PAL system) and the previous PTS value. The video decoder (50) then uses the estimated picture PTS values to perform picture decoding.

The above-mentioned operation samples the video data to obtain a Buffer_Size and a Current_PTS. Since these two parameters occur roughly simultaneously, after the Buffer_Size decreases to zero, the Current_PTS is loaded into the video decoder to make it synchronized with the pictures. In the new sampling step, the Buffer_Size and Current_PTS values are reset and sampled again. Therefore, there is no accumulation error on our method. Sparsely PTS sampling also has higher immunity than approach of recording all picture PTS values.

Figure 1:
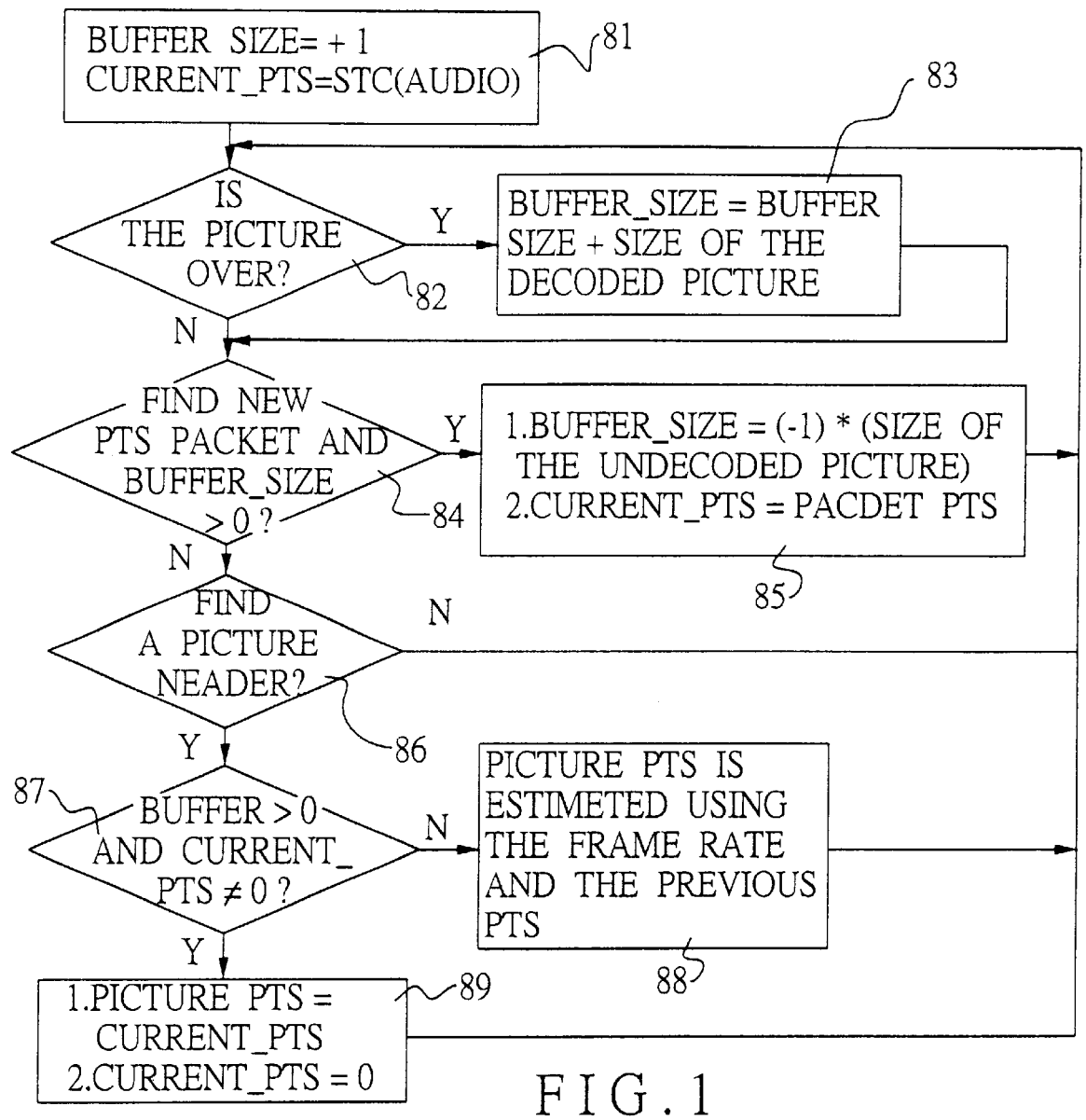
FIG. 1 is a logic diagram of the decoding method in accordance with the present invention.

With reference to FIG. 1, the general sequence in the method for performing synchronous decoding on video and audio signals in an AV packet-type bitstream in accordance with the present invention comprises the steps of setting/resetting the Current_PTS, setting the Buffer_Size and reducing it gradually (steps 82 through 85) and setting and estimating picture PTS values (steps 86 through 89).

In the beginning (step 81), the initial value of the Buffer_Size is +1 and the Current_PTS is set to be the same as the STC (System Time Clock) (which is the same as the audio PTS since the audio PTS is the time reference in the invention). In step 84, if a new video PTS packet is found and Buffer_Size>0, Buffer_Size=(−1)*(Size of the undecoded picture) in step 85, i.e. making it negative, and Current_PTS=the PTS value of the new packet. The meanings of the parameters are shown in FIG. 3. After this step is completed, the procedure returns to step 82 to determine whether the picture is over. If one picture is over, then Buffer_Size=Buffer_Size+(Size of the decoded picture). This step decreases the magnitude of Buffer_Size (step 83). If Buffer_Size is determined to be negative still (step 84), i.e. not totally cancelled, then the step determines whether a picture header is found (step 86). If it is not found, then the procedure returns to the previous loop for decreasing the magnitude of Buffer_Size. If a picture header is found, then a picture PTS value is estimated using the frame rate and the previous PTS value (step 88) while Buffer_Size is still negative (not totally cancelled) in step 87. The picture PTS value is then sent to the video decoder (50) in FIG. 3 to perform picture decoding and the procedure goes back to the previous loop. If Buffer_Size is positive (i.e. totally cancelled), then the previously stored Current_PTS substitutes the picture PTS and Current_PTS is reset to be zero (step 89). The procedure then returns to the previous loop. The above steps complete one PTS sampling and an estimation of unsampled PTS value.

Figure 2:
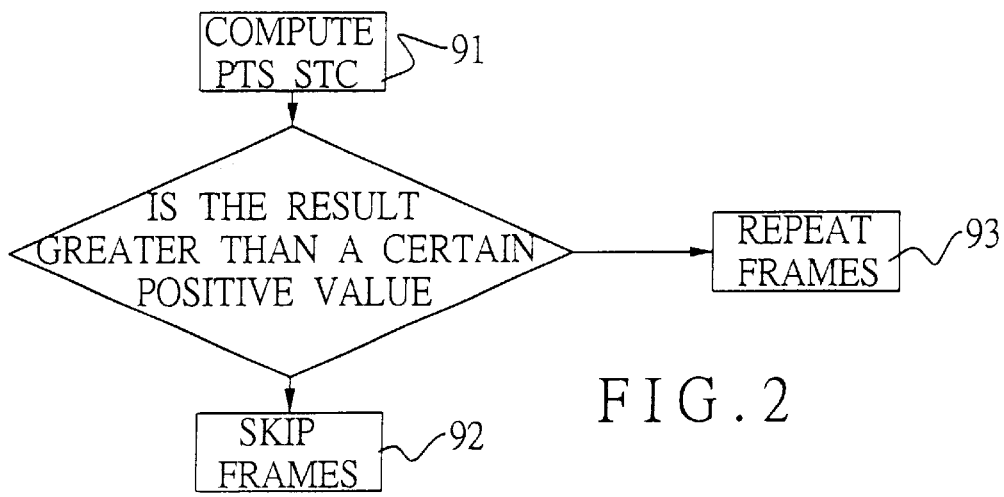
FIG. 2 is a logic diagram of the process to determine whether to skip or repeat pictures in accordance with the present invention.

When performing the second sampling, the previously mentioned steps are repeated. When Buffer_Size>0 (step 84) it is reset to the negative of the size of the undecoded picture (step 85) and the new packet PTS is set to be Current_PTS. Unsampled picture PTS values are obtained by estimation (step 88). These steps are performed repeatedly. FIG. 2 shows that using the relation between the picture PTS and the STC (step 91) can determine whether frames should be skipped (step 93) or repeated (step 92) so that the STC and the audio PTS can be synchronized.

During non-sampling periods the invention does not record the PTS values. However, since MPEG AV data feature smoothness and continuity under normal use, even a slight deviation is still a permissible. Therefore, the disclosed method indeed provides an AV synchronous decoding method that has better noise immunity for bad video sources.

From the above description, one knows that no PTS buffer is needed throughout the whole procedure. Only two variables (Current_PTS and Buffer_Size) are enough. In comparison with traditional structures, the invention does not only have a simpler structure but also prevents from overflow or underflow in the PTS buffer by not continuously referring to video packets. The PTS values at non-sampled points are estimated from the frame rate and the previous PTS value. The method can thus provide a smoother AV packet synchronous decoding even when the picture quality is not good enough.

The invention may be varied in many ways by a skilled person in the art. Such variations are not to be regarded as a departure from the spirit and scope of the invention, and all such modifications are intended to be included within the scope of the following claims.

What is claimed is:

1. A synchronous decoding method for AV (Audio/Video) packets, which comprises the steps of:

setting an audio PTS (Presentation Time Stamp) to be a synchronization reference to continuously refresh an STC (System Time Clock);

providing a Buffer_Size parameter and a Current_PTS parameter and setting their initial values;

when a new PTS packet is detected and Buffer_Size is zero setting Current_PTS to be the PTS value of the new packet and setting Buffer_Size to be the size of data in a video buffer to be decoded, while ignoring other PTS values;

reducing the magnitude of Buffer_Size by the size of decoded video data each time the decoding of the video data is completed;

when the video decoder detects a picture header and thus starts to perform picture decoding, setting the decoded picture PTS value as Current_PTS if Buffer_Size is zero and using the previous PTS value and a frame rate to estimate a PTS value for the picture otherwise; and repeating the previous steps until the video data are over.

2. The method of claim 1, wherein the initial value of Buffer_Size is +1.

3. The method of claim 1, wherein the initial value of Current_PTS is equal to the STC.

4. The method of claim 1, wherein the step of determining whether Buffer_Size is empty (zero) when the video decoder detects a picture header further comprises the step of determining whether Current_PTS is empty.

5. The method of claim 1, wherein the step of setting the decoded picture PTS value as Current_PTS further comprises the step of resetting Current_PTS at the same time.

6. A synchronous decoding method for AV packets that sets an audio PTS as an STC so as to make a video PTS synchronous with the STC, comprising the steps of:

reading video packets in order into a video buffer;

storing the PTS value of a newly read video packet in Current_PTS;

storing the size of data to be decoded in the video buffer in Buffer_Size;

reducing Buffer_Size as the picture is decoded gradually;

setting the previously stored Current_PTS as the picture PTS value of the picture to be decoded once Buffer_Size is zero and estimating the picture PTS value using the previous PTS value and a frame rate otherwise;

repeating the step of storing the PTS value of a newly read video packet in Current_PTS and the step of storing the size of data to be decoded in the video buffer in Buffer_Size; and repeating the step of reducing Buffer_Size as the picture is decoded gradually, the step of determining Buffer_Size, and the step of setting the picture PTS value.

7. The method of claim 6, wherein the initial value of Buffer_Size is +1.

8. The method of claim 6, wherein the initial value of Current_PTS is equal to the STC.

9. The method of claim 6, wherein the step of determining whether Buffer_Size is empty (zero) further comprises the step of determining whether Current_PTS is empty.

10. The method of claim 6, wherein the step of setting the decoded picture PTS value as Current_PTS further comprises the step of resetting Current_PTS at the same time.

* * * * *